Aug. 27, 1929.  D. COLLINS  1,726,385
VEHICLE WHEEL
Filed Jan. 20, 1928
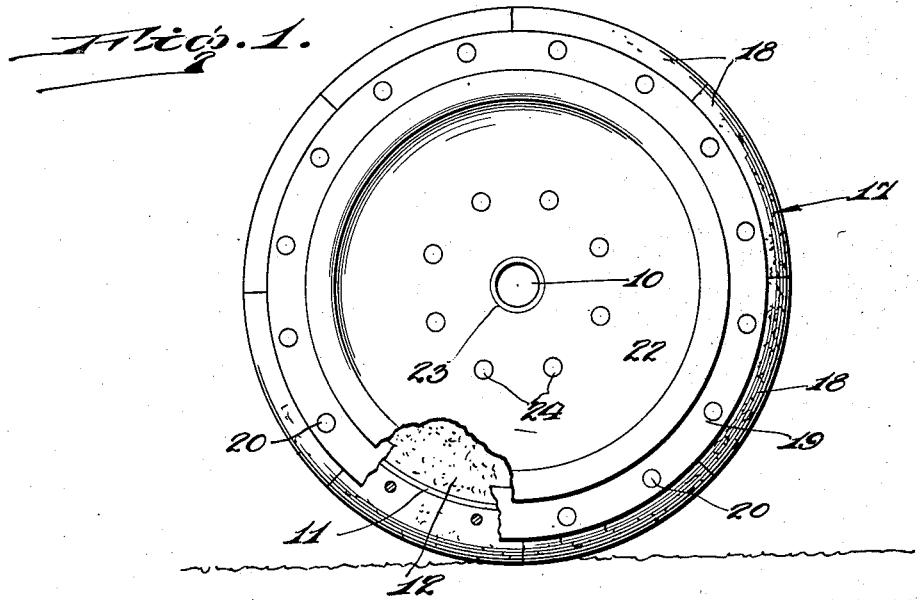
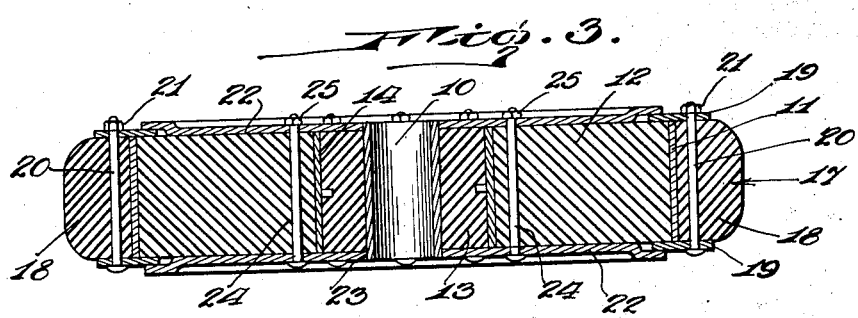
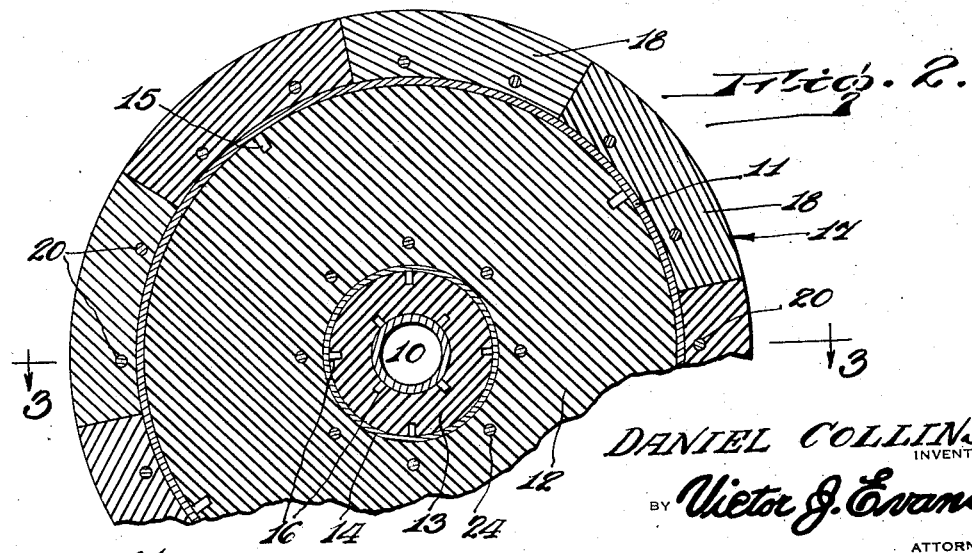
DANIEL COLLINS
INVENTOR
BY *Victor J. Evans*
ATTORNEY Patented Aug. 27, 1929.

1,726,385

UNITED STATES PATENT OFFICE.

DANIEL COLLINS, OF NEW YORK, N. Y.

VEHICLE WHEEL.

Application filed January 20, 1928. Serial No. 248,248.

This invention relates to improvements in vehicle wheels and has particular reference to the type of wheels disclosed in the patents granted to me October 11, 1921, #1,393,504 and April 1, 1924, #1,489,193.

The primary object of the invention is similar to the objects set forth in my prior patents, which is to provide a solid tire wheel having the attributes of a pneumatically tired wheel for absorbing shocks and strains during the passage of the wheel over an uneven roadway. However, this invention differs from my prior ones, by dispensing with certain parts, which gives to the wheel a more finished appearance without affecting the good qualities of the same.

Another object is to provide a vehicle wheel having a solid tread composed of a plurality of segmental sections removably supported by annular rings which bridge the joint between the tread and the yieldable body on the sides thereof, while plate disks overlap the annular rings to conceal the yieldable body to impart the appearance of a disk wheel.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my improved vehicle wheel with a portion of the same broken away.

Figure 2 is a longitudinal sectional view through the wheel.

Figure 3 is a vertical transverse sectional view on the line 3—3 of Figure 2.

Referring more particularly to the drawing, the reference numeral 10 designates the hub of my wheel and 11 the felly thereof, between which I provide an outer rubber cushion 12 and a inner rubber cushion 13, the cushions being separated by an annular ring 14. For preventing circumferential shifting of the outer cushion, I provide the felly with equi-distantly spaced inwardly extending lugs 15, while the hub and ring 14 have radially extending lugs 16, the same extending in opposite directions and in staggered radial arrangement with respect to each other. The lugs 15 and 16 embed themselves into the rubber cushions 12 and 13 respectively.

Encircling the felly 11 is a solid tire 17 which is constructed of a plurality of segmental sections of rubber 18, which co-act to provide a continuous rubber tire for the wheel. Annular rings 19 are mounted on opposite sides of the wheel and bridge the joint between the tire and the body of the wheel as clearly shown in Figures 1 and 3 of the drawings. Bolts 20 pass through aligned openings in the rings 19 and through openings in the segmental tire sections, the free ends of the bolts being threaded to receive retaining nuts 21. Side disk plates 22 are mounted on the sides of the body of the wheel, the outer peripheral edge of the disks overlapping the inner edges of the rings 19 and which disk plates are provided with central openings 23 for alignment with the opening in the hub 10. The disk plates 22 are removably attached to the body of the wheel by bolts 24 which pass through aligned openings in the disks and outer cushion 12, the said bolts being threaded on their free ends to receive retaining nuts 25. By overlapping the rings 19 with the disk plates 22, it is possible for the tire and body to have inward yielding movement during the passage of the wheel over a road bed.

From the foregoing description, it will be seen that I have provided a resilient vehicle wheel capable of absorbing shocks and strains during the passage of the wheel over a road, and which wheel is equipped with a solid tire made up of a plurality of segmental sections any of which may be removed and replaced when worn. The side disk plates 22 fully encloses the cushion body of the wheel to exclude dust and water therefrom and also imparts a finished appearance to the wheel to simulate the well-known style of "disk wheel."

While I have shown and described what I consider to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A vehicle wheel comprising a hub, a felly, a solid tire encircling said felly, a yieldable cushion body between said felly and said hub, annular rings removably secured to said tire and overlapping the joint between the same and said yieldable body, and plate disks removably secured to said yieldable body and having their peripheries overlapping said annular rings.

2. A vehicle wheel comprising a hub, an inner yieldable cushion surrounding said hub, an outer cushion beyond said inner cushion, an inner felly interposed between said inner and outer cushions, an outer felly encircling said outer cushion, means for preventing circumferential shifting of said inner and outer cushions, a solid yieldable tire surrounding said outer felly, rings secured to opposite sides of said tire and overlapping the joint between said tire and said outer cushion, and disks secured to said outer cushion and overlapping said rings, substantially as and for the purpose specified.

In testimony whereof I hereby affix my signature.

DANIEL COLLINS.